United States Patent [19]
Yamamoto et al.

[11] Patent Number: 5,233,578
[45] Date of Patent: Aug. 3, 1993

[54] METHOD OF RECORDING INFORMATION ON A RECORDING MEDIUM HAVING AT LEAST TWO MAGNETIC LAYERS

[75] Inventors: Masakuni Yamamoto, Yamato; Koyo Hasegawa, Tokyo; Yasuyuki Miyaoka, Yokohama; Yutaka Ogasawara, Yokohama; Makoto Hiramatsu, Yokohama; Susumu Matsumura, Kawaguchi, all of Japan

[73] Assignee: Canon Kabushiki Kaisha, Tokyo, Japan

[21] Appl. No.: 979,459

[22] Filed: Nov. 20, 1992

Related U.S. Application Data

[63] Continuation of Ser. No. 458,567, Dec. 28, 1989, abandoned.

[30] Foreign Application Priority Data

Dec. 28, 1988 [JP]  Japan ................................. 63-332624
Jan. 19, 1989 [JP]  Japan ..................................... 1-8552

[51] Int. Cl.⁵ ............................................. G11B 11/10
[52] U.S. Cl. ..................................... 369/13; 369/100; 369/275.2; 369/283
[58] Field of Search ............. 369/13, 14, 15, 99, 369/100, 110, 283, 292, 275.2, 284, 286; 360/59; 428/692, 694, 900

[56] References Cited

U.S. PATENT DOCUMENTS

| | | | |
|---|---|---|---|
| 4,466,004 | 8/1984 | Kobayashi et al. | 346/74.4 |
| 4,633,450 | 12/1986 | Gueugnon | 369/13 |
| 4,794,560 | 12/1988 | Bell | 360/59 |
| 4,855,975 | 8/1989 | Akasaka et al. | 369/13 |
| 4,878,132 | 10/1989 | Aratani | 360/59 |
| 4,908,809 | 3/1990 | Tadokoro et al. | 369/13 |
| 5,025,430 | 6/1991 | Tadokoro et al. | 369/13 |

FOREIGN PATENT DOCUMENTS

| | | | |
|---|---|---|---|
| 02538978 | 3/1988 | European Pat. Off. | |
| 0285461 | 10/1988 | European Pat. Off. | 369/13 |
| 0333467 | 9/1989 | European Pat. Off. | 369/283 |
| 3903248 | 8/1989 | Fed. Rep. of Germany | 369/283 |
| 0078652 | 5/1982 | Japan | 360/59 |
| 3239636 | 10/1988 | Japan | 369/283 |
| 63-276731 | 11/1988 | Japan | |
| 1-017240 | 1/1989 | Japan | 369/283 |
| 1-032441 | 2/1989 | Japan | 369/283 |
| 0052239 | 2/1989 | Japan | 369/283 |
| 1-078449 | 3/1989 | Japan | 369/283 |
| 0102759 | 4/1989 | Japan | 369/283 |
| 0151038 | 6/1989 | Japan | 360/59 |
| 0179246 | 7/1989 | Japan | 369/13 |
| 1-263960 | 10/1989 | Japan | 369/283 |

OTHER PUBLICATIONS

G. H. May, "Beam Addressable High-Density Magnetic Record File," IBM Technical Disclosure Bulletin, vol. 16, No. 7, Nov. 1973, pp. 2365-2366.

Primary Examiner—Eugene R. LaRoche
Assistant Examiner—Tan Nguyen
Attorney, Agent, or Firm—Fitzpatrick, Cella, Harper & Scinto

[57] ABSTRACT

Disclosed is a method of recording information on a magnetooptical recording medium, which medium includes a first magnetic layer and a second magnetic layer having a lower Curie temperature and a higher coercive force at room temperature than those of the first magnetic layer. The second magnetic layer is exchange-coupled to the first magnetic layer. The first magnetic layer has a higher compensation temperature than the Curie temperature of the second magnetic layer. The method of recording information includes applying a magnetic field, which is modified in accordance with information from a magnetic head, to the medium to record information on the first magnetic layer and scanning the medium with a light beam to heat the medium to a temperature at least near the Curie temperature of the second magnetic layer so as to transfer the information recorded on the first magnetic layer to the second magnetic layer.

27 Claims, 10 Drawing Sheets

METHOD OF RECORDING INFORMATION ON A RECORDING MEDIUM HAVING AT LEAST TWO MAGNETIC LAYERS

This application is a continuation of prior application, Ser. No. 07/458,567 filed Dec. 28, 1989, now abandoned.

BACKGROUND OF THE INVENTION

1. Field of the Invention

The present invention relates to a method of recording information on a recording medium using an interaction between light and magnetism.

2. Related Background Art

As a memory using the above-mentioned method, for example, a magnetooptical disk apparatus, or the like, is known. The magnetooptical disk apparatus has been receiving a lot of attention since it has a large storage capacity and is erasable and rewritable. In order to further increase data transfer speed, various studies have been made to achieve an over-write operation, an increase in storage capacity, and the like.

As an over-write method, a so-called magnetic field modulation method is known. In this method, an external magnetic field is modulated in accordance with information to be recorded, while irradiating a light beam of a given power, and the modulated magnetic field is applied to a medium, thereby reversing a direction of magnetization of a recording layer and forming a pit. The magnetic field modulation method is described in detail in U.S. Pat. No. 4,446,004, for example.

However, in the magnetic field modulation method, a formed pit has an arrow-like shape. For this reason, posed are problems of edge variation and erasure error such that a portion to be erased remains. Thus, it is difficult to realize so-called pit length recording by representing information by the length of a pit.

As another over-write method, published European Patent Application 258,978 proposes a method using a medium having two magnetic layers. This method employs a magnetooptical recording medium having a first magnetic layer, and a second layer which has a lower Curie temperature and a higher coercive force at room temperature than those of the first layer, and is exchange-coupled to the first layer. A light beam which is modulated between two power levels ($\neq 0$) in accordance with information is irradiated on the medium while applying a given external magnetic field thereto, thereby recording information.

On the other hand, IBM Technical Disclosure Bulletin Vol. 16, No. 17 (December, 1973, pp. 2365 to 2366) discloses a recording method by means of a thermomagnetic transfer process. In this method, an iron-oxide disk constituted by two layers having different coercive forces is used. A track having a wide pattern is recorded on a storage transmission layer having a low coercive force by a magnetic transducer. A portion of the track is scanned by a light beam to transfer only this portion of information on the transmission layer to a main storage layer, thereby accumulating information at a high density. Information is read out by the conventional magnetic transducer in such a manner that information is transferred from the main storage layer to the storage transmission layer.

Japanese Patent Laid-Open (Kokai) No. 63-276731 discloses a method using a disk having a two-layered structure, i.e., a Co-Cr alloy thin film and a Tb-Fe thin film. In this method, information is recorded on the Co-Cr film using a magnetic head, and is transferred to the Tb-Fe film using an optical head. Information is reproduced using a magnetooptical effect such that a light beam is irradiated on the Tb-Fe film and reflected light is detected. With this method, an erasure error can be eliminated, and pit length recording can be easily realized.

However, the method of the thermomagnetic transfer process suffers from the following problems.

1) An apparent coercive force of the low-coercive force layer is increased by an exchange coupling force from the high-coercive force layer, and a considerably strong magnetic field is required to perform recording. For this reason, load on the head is increased, and a high-frequency signal cannot be recorded.

2) In general, a material having a higher Curie temperature exhibits a larger magnetooptical effect. However, since information is reproduced from a layer having a lower Curie temperature, a large reproduction signal is not easily obtained.

SUMMARY OF THE INVENTION

It is an object of the present invention to provide an information recording method which can solve the conventional problems, and allows a stable over-write operation up to a high-frequency signal.

It is another object of the present invention to provide an information recording/reproduction method which allows a stable over-write operation, and can obtain a large reproduction signal.

In order to achieve the above objects, there is provided a method of recording information on a magnetooptical recording medium which is constituted by a first magnetic layer, and a second magnetic layer which has a lower Curie temperature and a higher coercive force at room temperature than those of the first magnetic layer, and is exchange-coupled to the first magnetic layer, and in which the first magnetic layer has a higher compensation temperature than the Curie temperature of the second magnetic layer. The method includes the steps of:

applying a magnetic field, which is modulated in accordance with information from a magnetic head, to the medium to record information on the first magnetic layer; and scanning the medium with a light beam to heat the medium to a temperature at least near the Curie temperature of the second magnetic layer so as to transfer the information recorded on the first magnetic layer to the second magnetic layer.

In order to stably perform recording by the magnetic head, an exchange coupling force adjusting layer is provided which has a direction of magnetization corresponding to the in-surface direction at room temperature, and in which the direction of magnetization becomes perpendicular to a film surface or magnetization dissipates when temperature is increased. The exchange coupling force adjusting layer decreases the exchange coupling force upon transfer of the information between the first and second magnetic layers to be lower than that upon recording of the information onto the first magnetic layer.

In order to obtain a large signal output when information is read out using a magnetooptical effect, a third magnetic layer having a larger magnetooptical effect than that of the second magnetic layer is provided on the second magnetic layer on a side opposite to the first magnetic layer, and the information can be read out after it is transferred from the first magnetic layer to the third magnetic layer.

DETAILED DESCRIPTION OF THE PREFERRED EMBODIMENTS

Figure 1:
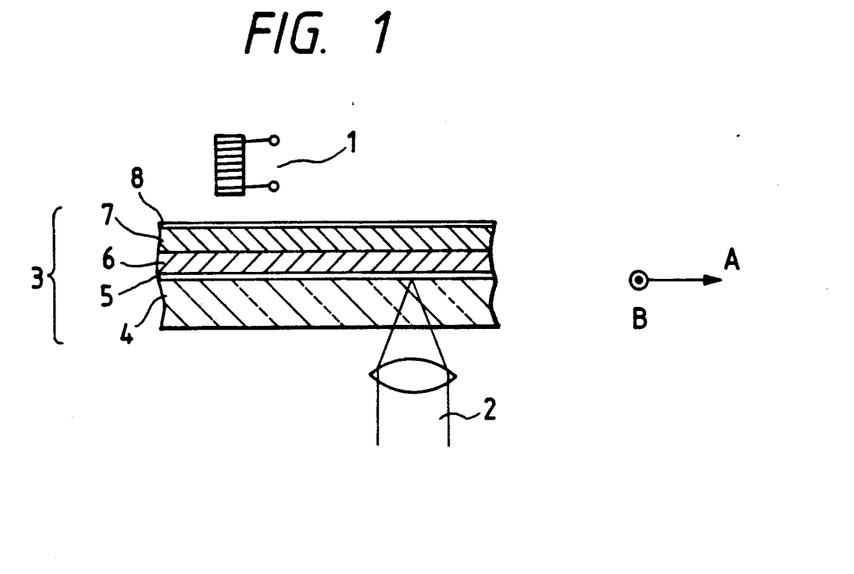
FIG. 1 is a schematic view for explaining an embodiment of a recording method of the present invention.
Figure 2:
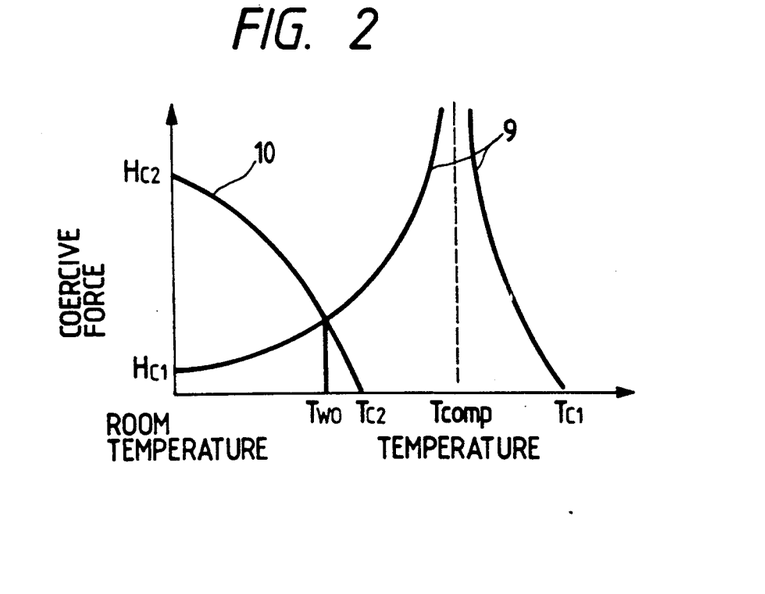
FIG. 2 is a graph showing characteristics of a magnetooptical disk used in the present invention.

FIG. 1 is a schematic view for explaining an embodiment of a recording method of the present invention. In FIG. 1, a perpendicular magnetic head 1 is arranged above a magnetooptical disk 3. An objective lens 2 in an optical head (not shown) is arranged below the disk 3. The disk 3 includes a base 4, a protection and interference layer 5, a recording magnetic layer 6, a recording reference magnetic layer 7, and a protection layer 8. FIG. 2 shows coercive force characteristics of these magnetic layers as a function of temperature. A curve 9 represents characteristics of the recording reference magnetic layer 7. More specifically, the reference magnetic layer 7 has a low coercive force $H_{C1}$ at room temperature and a high Curie temperature $T_{C1}$. On the other hand, a curve 10 represents characteristics of the recording magnetic layer 6. The recording magnetic layer 6 has a higher coercive force $H_{C2}$ at room temperature, and a lower Curie temperature $T_{C2}$ than those of the reference magnetic layer 7. $T_{comp}$ of the curve 9 indicates a compensation temperature of the reference magnetic layer 7.

Assume that the magnetooptical disk with the above structure is moved in a direction of an arrow A, as shown in FIG. 1. A light spot from the optical head is incident from the base side. A light spot size on the magnetic layer is about 1 μm. A tracking servo for scanning a desired track with this light spot is performed by a well known method.

The perpendicular magnetic head 1 floats on a side opposite to the base to provide a small gap from the medium, and is located at a position on a track scanned with the light spot slightly advanced from the light spot. These heads must be separated by at least a distance large enough not to overlap a range of the influence of heat by the light spot and a range of the influence of a magnetic field by the perpendicular magnetic head. Tracking of the perpendicular magnetic head is performed according to that of the optical head.

Figure 3A:
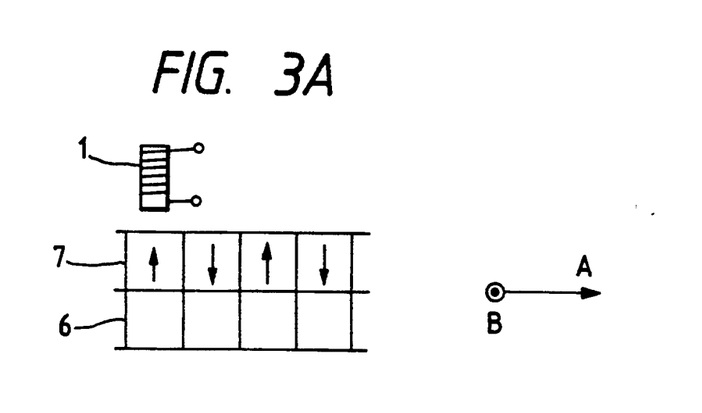
FIGS. 3A, 3B, 4A, and 4B are views for explaining recording and transfer processes according to the present invention.
Figure 3B:
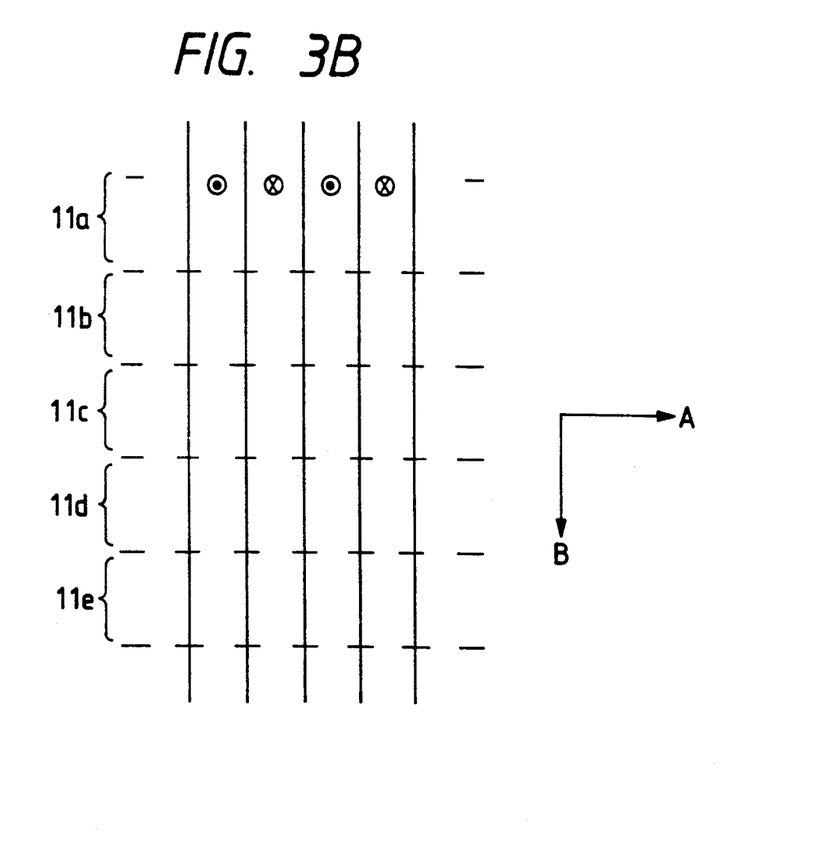
Figure 4A:
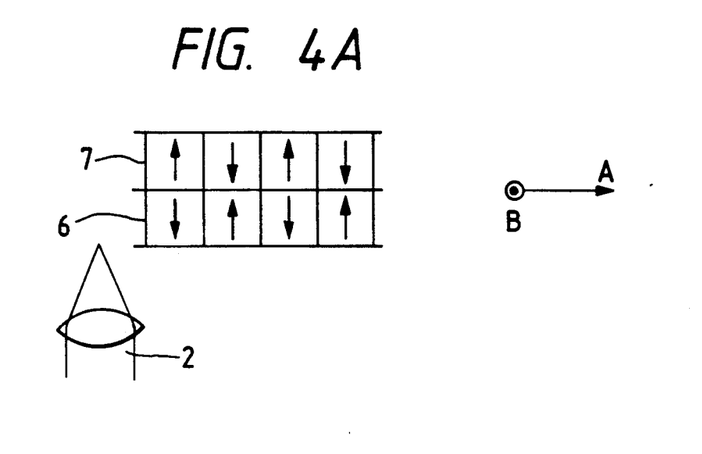
Figure 4B:
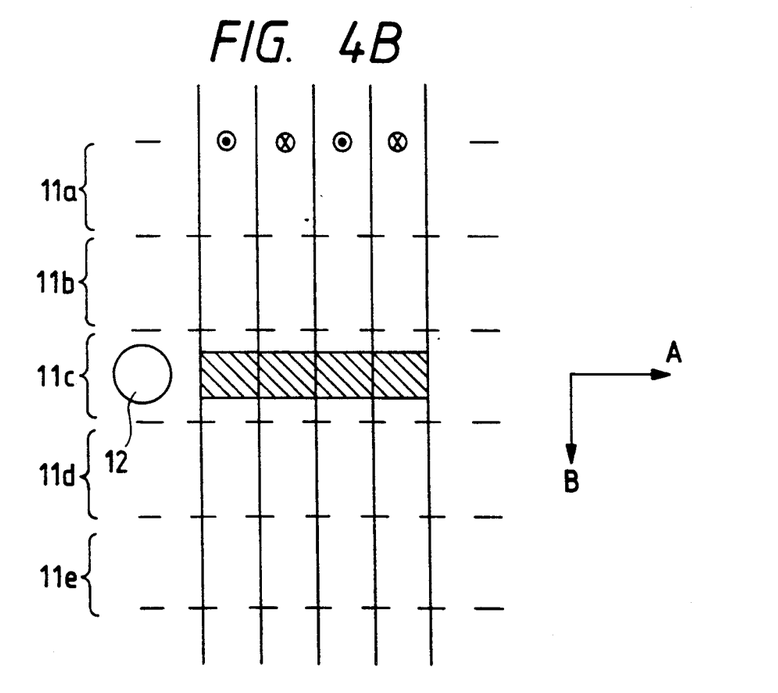

An information recording method will be described below with reference to FIGS. 3A, 3B, 4A and 4B. FIGS. 3A and 4A are schematic sectional views of the magnetooptical disk, and FIGS. 3B and 4B are plan views thereof. In FIG. 3A, a magnetic field is modulated in accordance with information to be recorded using the perpendicular magnetic head 1. In this case, if a maximum absolute value of a magnetic field on the magnetic layer takes an appropriate value between the coercive forces $H_{C1}$ and $H_{C2}$ of the recording reference magnetic layer (to be referred to as a reference layer hereinafter) 7 and the recording magnetic layer (to be referred to as a recording layer hereinafter) 6 at room temperature, a pit as an upward or downward perpendicular magnetic domain string is formed in the reference layer 7 in accordance with the modulated magnetic field. However, since the strength of the applied magnetic field is smaller than the coercive force of the recording layer 6, the recording layer 6 is not influenced by the magnetic field, and a previous state is maintained.

The length of the pit recorded by the perpendicular magnetic head in a direction parallel to the track can be of a submicron order, and the line density can be increased to be higher than that of a conventional bit recorded by an optical head. The width of the bit in a direction perpendicular to the track corresponds a range of several tracks to twenty tracks, and tracking precision required for the perpendicular magnetic head can be moderated.

In FIG. 3B, each of tracks 11a to 11e has a width of 1 to 2 μm. A pit recorded by the perpendicular magnetic head becomes a magnetic domain string indicated by a solid line. Assuming that a track to be subjected to recording is represented by reference character 11c, the magnetic domain string is over-written on previous data over in a range from several tracks to twenty tracks to provide the track 11c as almost in the center.

After the magnetic domain string is recorded by the perpendicular magnetic head 1, the desired track 11c is scanned by a spot 12 of the optical head 2, as shown in FIG. 4B. Light intensity is controlled in accordance with a rotational speed of the disk so that the temperature of the magnetic layer at that time is increased to an appropriate temperature between the Curie temperatures $T_{C1}$ and $T_{C2}$ of the reference layer 7 and the recording layer 6. Thus, on the desired track 11c of the recording layer 6 which is heated beyond the Curie temperature $T_{C2}$ by the light spot 12, magnetization dissipates, thereby erasing previously recorded information. After the light spot passes by and the temperature is decreased below the Curie temperature $T_{C2}$, magnetization corresponding to that of the reference layer 7 appears. More specifically, a magnetic domain string corresponding to that of the reference layer 7 is transferred to a hatched region of the recording layer 6 shown in FIG. 4B, thus writing information.

Since the reference layer 7 has a compensation temperature higher than room temperature and its coercive force is increased at such a temperature upon transfer, a stable transfer operation is assured.

In this manner, the recorded pit finally has a rectangular shape. The length of the pit in a direction parallel to the track is of a submicron order as it is recorded by the perpendicular magnetic head, and the width of the bit in a direction perpendicular to the track is about 1 μm determined by the light spot of the optical head.

On the other hand, information is reproduced as follows. That is, a desired track is scanned by the light spot of the optical head, so that the temperature of the magnetic layer becomes lower than the Curie temperature $T_{C2}$ of the second layer, and the direction of perpendicular magnetization of the desired track of the recording layer is detected as a difference in polarization state of reflected light by a magnetooptical effect such as the Kerr effect, the Faraday effect, the effect of circular dichroism, or the like.

If a temperature at an intersection of the curves 9 and 10 shown in FIG. 2 is represented by $T_{\kappa 0}$, the temperature of the magnetic layer in a recording mode should be set between $T_{\kappa 0}$ and $T_{C1}$, and the temperature of the magnetic layer in a reproduction mode should be set below $T_{\kappa 0}$.

In this method, the power of a semiconductor laser in the recording and reproduction modes may be given by binary data.

Recording on the reference layer by the magnetic head may be realized by an over-write operation as described above, or by erasing information by the same magnetic head or a second magnetic head after information is transferred by the light spot in order to eliminate the influence of an erasure error.

Figure 5:
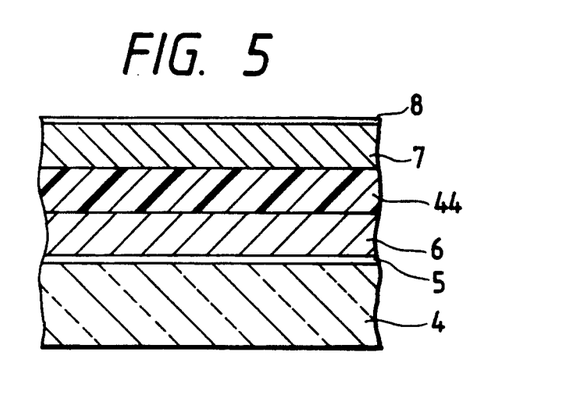
FIGS. 5 and 6 are schematic sectional views showing other structures of magnetooptical disks used in the present invention.
Figure 6:
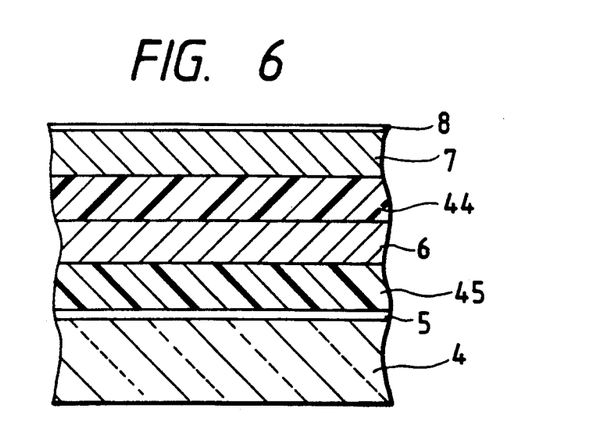
Figure 7:
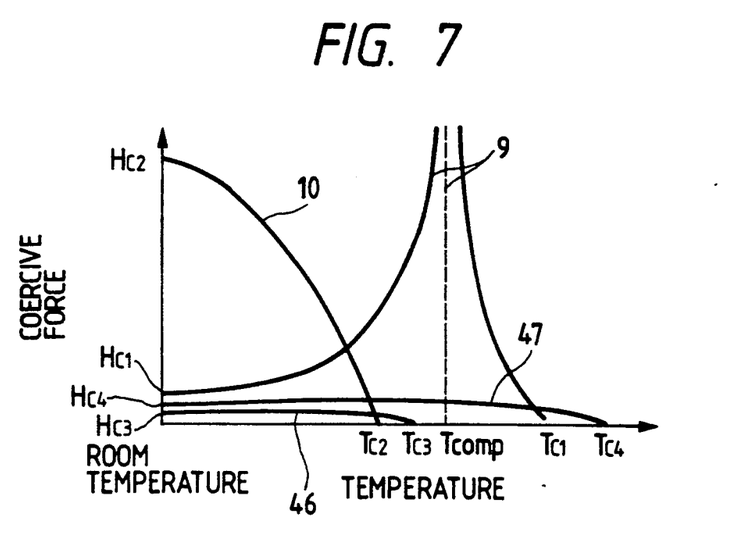
FIGS. 7 to 10 are graphs showing characteristics of the magnetooptical disk used in the present invention.

FIGS. 5 and 6 show other structures of magnetooptical disks used in the present invention, and FIG. 7 shows coercive force characteristics of layers as a function of temperature in these disks.

In FIG. 5, an exchange coupling force adjusting layer 44 is arranged between the reference layer 7 and the main recording layer 6 in the structure of the magnetooptical disk shown in FIG. 1. A coercive force $H_{C3}$ at room temperature and a Curie temperature $T_{C3}$ of this layer have characteristics represented by a curve 46 in FIG. 7. This layer has the following features. That is, this layer is magnetized in the in-surface direction at room temperature, and when its temperature is increased by the power of the light spot in the recording mode, the adjusting layer 44 has a perpendicular magnetization in the same direction as the direction of magnetization of the reference layer 7, or its magnetization dissipates. The adjusting layer 44 serves to weaken an exchange coupling force between the reference layer 7 and the recording layer 6 at room temperature. For this reason, the magnetic field strength in the recording mode can be decreased to be closer to $H_{C1}$.

In FIG. 6, a reproduction layer 45 is arranged between the recording layer 6 and the protection and interference layer 5 in the structure shown in FIG. 5. As described above, a magnetic layer having a higher Curie temperature has a larger Kerr rotational angle caused by the Kerr effect in the reproduction mode. For this reason, a coercive force $H_{C4}$ and a Curie temperature $T_{C4}$ of the reproduction layer 45 have characteristics as represented by a curve 47 in FIG. 7. In the reproduction layer 45, perpendicular magnetization corresponding to magnetization of the pit in the recording layer 6 appears by the exchange coupling force with the recording layer 6 at a temperature increased by the power of the light spot in the reproduction mode. Since reflection of light in the reproduction mode is mostly influenced by the reproduction layer 45, the Kerr rotational angle is increased as compared to reflection in the recording layer 6.

Figure 8:
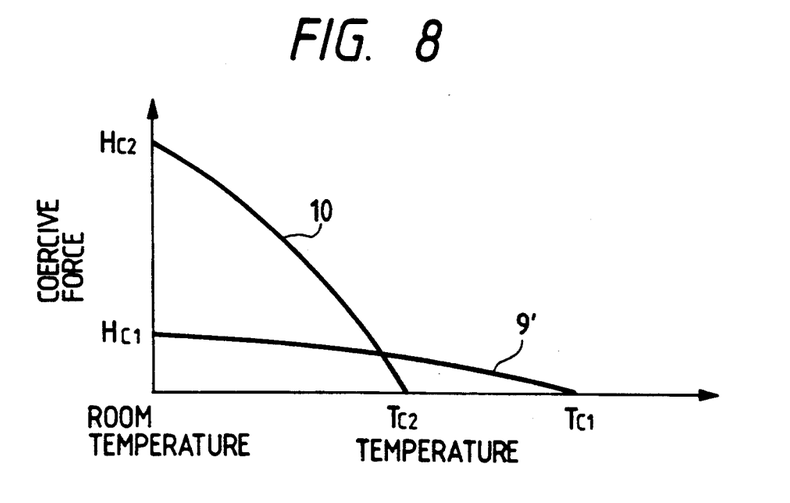
Figure 9:
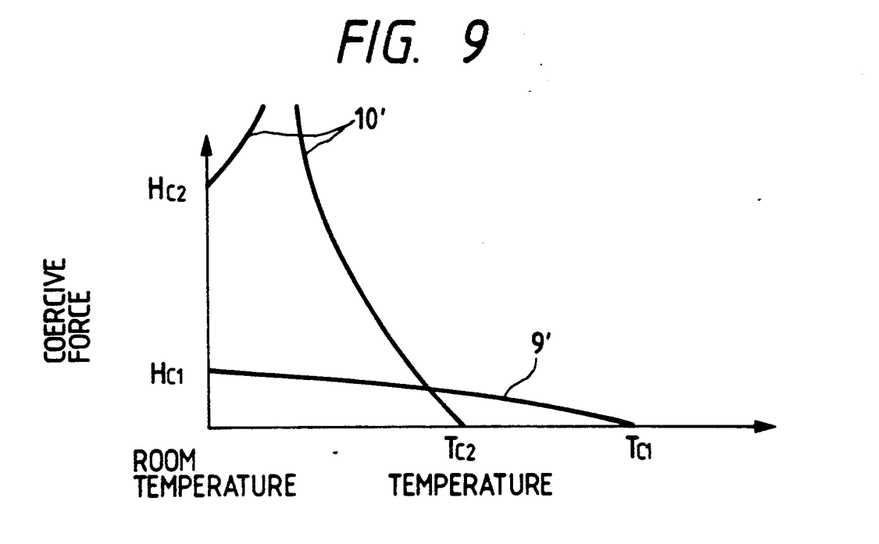
Figure 10:
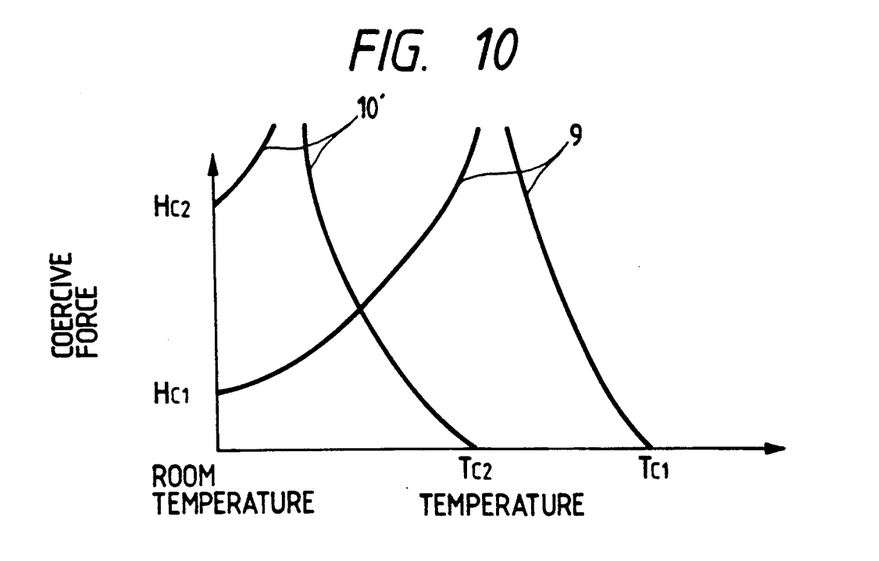

As has been described above, as the characteristics of the reference layer 7 and the recording layer 6, the reference layer 7 has a compensation temperature (curve 9), but the recording layer has no compensation temperature at a temperature higher than the room temperature. The structure shown in FIG. 5 or FIG. 6 may have characteristics shown in FIGS. 8 to 10. FIGS. 8, 9, and 10 show characteristics wherein neither the reference layer 7 (curve 9') nor the recording layer 6 (curve 10) have a compensation temperature, characteristics wherein the reference layer 7 (curve 9') has no compensation temperature, but the recording layer 6 (curve 10') has a compensation temperature, and characteristics wherein both the reference layer 7 (curve 9) and the recording layer 6 (curve 10') have a compensation temperature.

As a material for each of the magnetic layers, an amorphous alloy as a combination of at least one type each of transition metals and rare-earth metals may be used. For example, transition metals include Fe, Co, and Ni, and rare-earth metals include Gd, Tb, Dy, Ho, Nd, and Sm. Typical combinations of these metals are TbFeCo, GdTbFe, GdFeCo, GdTbFeCo, GdDyFeCo, and the like.

The materials of the reference layer may be magnetic materials such as Co-Cr, Ba-Ferrite, MnBi, iron-oxide, Co-doped iron-oxide, $CrO_2$, Ni-Co, Fe-Ni-Co, materials, and the like, or a Heusler's alloy such as PtMnSb.

Figures 11, 12:
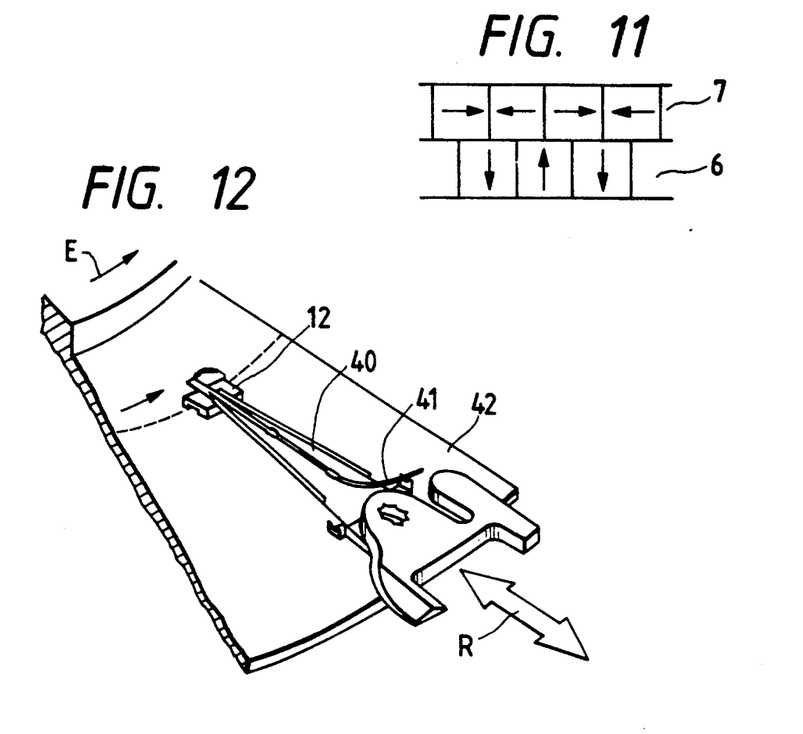
FIG. 11 is a schematic view showing a state of magnetization when an in-surface magnetization layer is used as a reference layer.
FIG. 12 is a schematic perspective view showing an arrangement of a recording apparatus used in the present invention.

The reference layer 7 may be a magnetic layer having in-surface magnetization, as shown in FIG. 11. In this case, an in-surface magnetic head is used for recording.

The base 4 is formed of a plastic material such as polycarbonate (PC), polymethyl methacrylate (PMMA), or the like, and may be thick and hard or thin and flexible.

FIG. 12 is a schematic perspective view showing a detailed arrangement of an apparatus used in the recording method of the present invention. The apparatus shown in FIG. 12 includes a magnetooptical disk 42. A slider 12 is arranged above the magnetooptical disk 42 to be supported by a plate spring member 40. The proximal end portion of the spring member 40 is coupled to a driving mechanism (not shown), and is movable in a track access direction R. The slider 12 is the same as that used in a Winchester magnetic recording apparatus called a "hard disk", as shown in detail in FIG. 13. The slider according to the present invention comprises a perpendicular magnetic head 13 and a light-emitting device 14 as a light beam spot irradiating means. The perpendicular magnetic recording head 13 generates a magnetic field in accordance with a current applied to a signal line 15. The light-emitting device 14 is a semiconductor laser whose lower surface serves as a light-emitting end, and emits light in accordance with a current applied to a signal line 16. The signal lines 15 and 16 are commonly connected to a signal line 41 (FIG. 12), and the signal line 41 is connected to an external power source (not shown).

Figure 13:
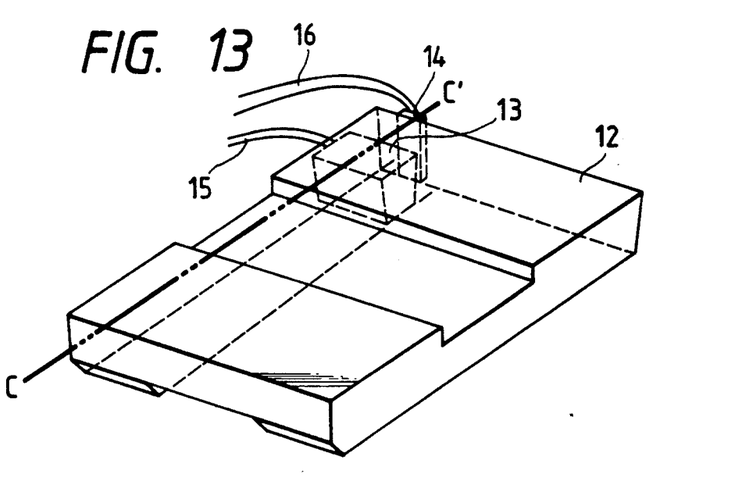
FIG. 13 is an enlarged perspective view of a slider shown in FIG. 12.
Figure 14:
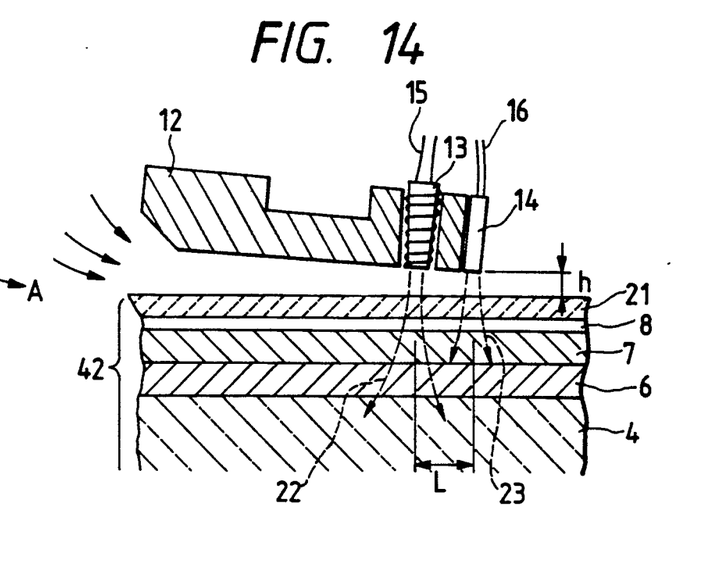
FIGS. 14 and 15 are respectively a schematic sectional view and a schematic plan view for explaining a recording state using the apparatus shown in FIG. 12.

FIG. 14 shows a section of the slider taken along a line C - C- in FIG. 13, and also shows a section of the magnetooptical disk 42. In FIG. 14, the same reference numerals denote the same parts as in FIGS. 12 and 13.

The magnetooptical disk 42 is constituted by forming a thin magnetic film consisting of two layers, i.e., the reference layer 7 and the recording layer 6 on the base 4. The silicon nitride protection film 8 is formed on the thin magnetic layer for the purposes of anti-oxidation, improvement of humidity resistance, and the like. Furthermore, as an uppermost layer, a wear-resistant layer 21 of a transparent resin is provided.

When the magnetooptical disk 42 is rotated at 1,800 or 3,600 rpm by a driver, the slider 12 floats by an air flow caused by relative movement between the slider and the disk. The slider 12 is almost fixed in position separated from the surface of the magnetooptical disk 42 by a distance h. The principle described above is the same as that for a magnetic head in the conventional Winchester magnetic recording apparatus. In this embodiment, a magnetic field 22 from the perpendicular magnetic recording head 13 and a light beam spot 23 from the light-emitting device 14 arranged in the slider 12 are applied to the magnetooptical disk 42, thereby recording information thereon. In this case, the air floating amount h of the slider 12 is determined by various parameters such as the rotational speed of the magnetooptical disk 42, the shape and weight (including those of the perpendicular magnetic head 13 and the light-emitting device 14) of the slider 12, the spring constant of the spring member 40, and the like. In practice, the amount h is about 1 $\mu$m. The thickness of the wear-resistance layer 21 is about several $\mu$m, and the thickness of the protection layer 8 is about 0.1 $\mu$m. Therefore, the distance between the recording layer 6 to the lower end faces of the perpendicular magnetic head 13 and the light-emitting device 14 is at most 10 $\mu$m or less, and preferably falls within the range of several $\mu$m.

Figure 15:
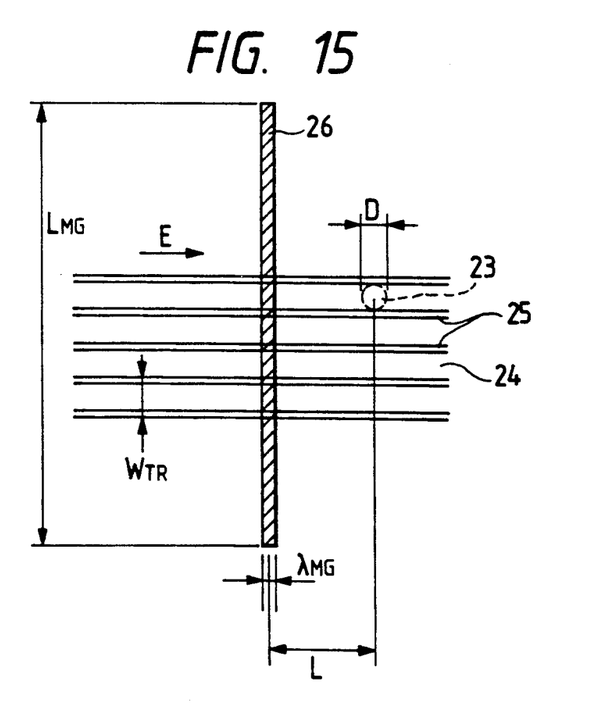

FIG. 15 is a view for explaining the recording principle of the present invention. Information is recorded on tracks 24 having a spiral or concentrical structure. A distance $W_{TR}$ between adjacent tracks is about 1 to 2 $\mu$m. In FIG. 15, a groove 25 is formed between adjacent tracks. However, this is not related to the gist of the present invention. A magnetic domain 26 is recorded in the reference layer 7 in the disk layer by a magnetic field from the perpendicular magnetic recording head. The recorded magnetic domain is the feature of perpendicular magnetic recording, and its width $\lambda_{MG}$ is very small and can be 1 $\mu$m or less. Contrary to this, a length $L_{MG}$ in a direction perpendicular to the track becomes relatively large due to limitations in the manufacture of the perpendicular magnetic recording head, and is about 10 $\mu$m. Therefore, the magnetic domain 26 recorded in the reference layer 7 by the perpendicular magnetic recording head 13 has a very high density and a small width $\lambda_{MG}$ in a direction parallel to the track, but has length $L_{MG}$ in a direction perpendicular to the track and extends over a plurality of information tracks. The role of the light beam spot 23 is to limit information recorded in the reference layer portion extending over several tracks to one track. A spot size D of the light beam spot 23 is smaller than one track width by a ridge type waveguide structure arranged at an output end of the semiconductor laser.

Figure 16:
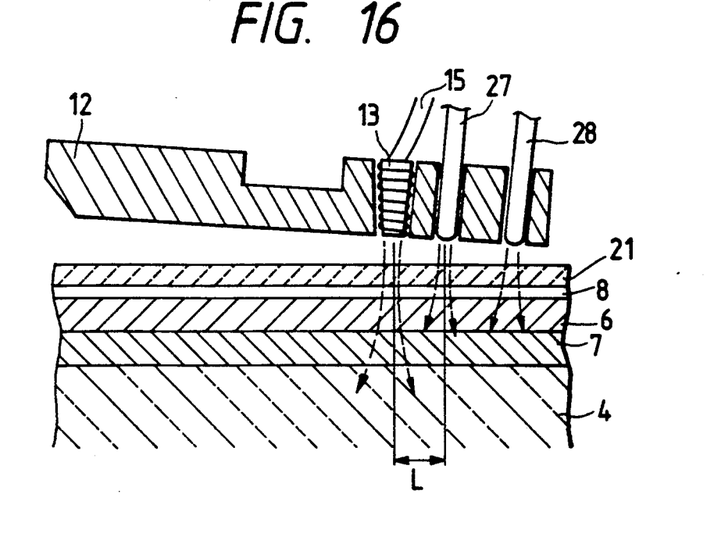
FIG. 16 is a schematic sectional view showing an arrangement of a recording/reproduction apparatus used in the present invention.

FIG. 16 shows another embodiment of an apparatus used in the present invention. In FIG. 16, the same reference numerals as in the embodiment shown in FIG. 14 denote parts having the same functions. This embodiment employs a magnetooptical head which can perform not only recording of information, but also reproduction. The structure of the magnetic films of the magnetooptical recording medium is opposite to that in the embodiment shown in FIG. 14 for the following reason. That is, as shown in FIG. 2, the Curie temperature of the reference layer is high, and in general, a magnetic film having a higher Curie temperature has a large Kerr rotational angle and is suitable for reproducing recorded information by utilizing the Kerr effect.

In this embodiment, a perpendicular magnetic recording head 13 for modulating a magnetic field and an optical fiber 27 for generating a heating spot have the same functions as the perpendicular magnetic recording head and the light-emitting device in the above embodiment. The optical fiber 27 guides light from a semiconductor laser (not shown), and outputs a light beam from a fiber output end which is machined into a lens shape, thereby forming a light beam spot on a reference layer. Heat distribution by the light beam spot is transmitted to a recording layer to transfer an information magnetic domain recorded in the reference layer. An optical fiber 28 projects a light beam spot for reproducing recorded information, and is a polarization plane-preserving single mode optical fiber for receiving light reflected by the magnetooptical recording medium. The output end of the optical fiber 28 is also machined into a lens shape in the same manner as in the optical fiber 27. The optical fiber 28 extends from a slider 12 to a spring member 40 in the same manner as the signal line 15, and is connected to a fixed optical system provided to a fixed portion of an optical information recording/reproduction apparatus.

Figure 17:
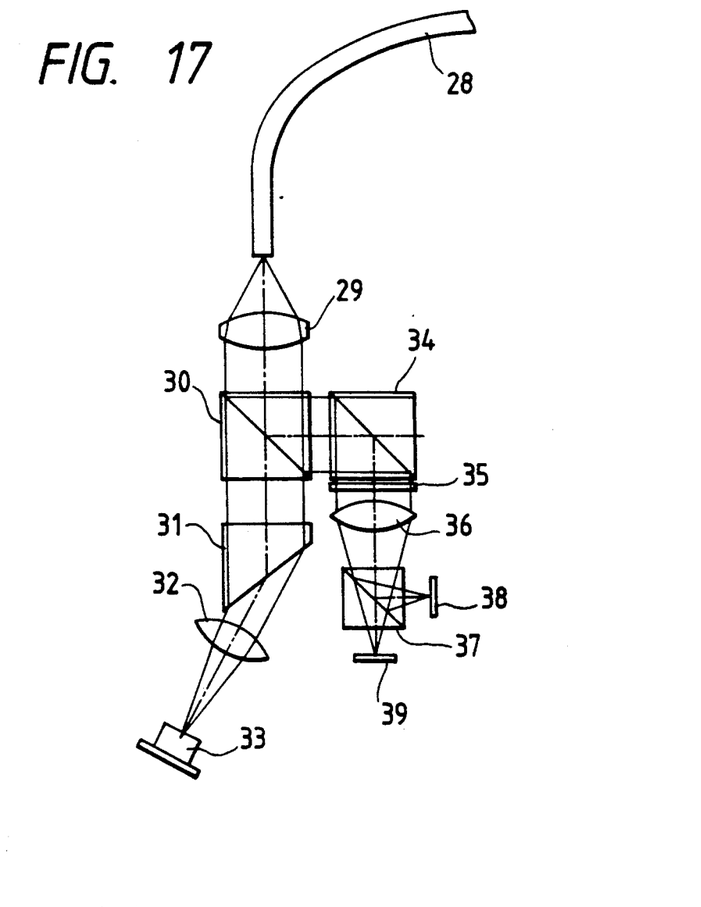
FIG. 17 is a schematic view showing an arrangement of a reproduction optical system in the apparatus shown in FIG. 16.

FIG. 17 schematically shows the fixed optical system. A P-polarized light beam from a semiconductor laser 33 is beam-shaped by a collimator lens 32 and a beam shaping prism 31, and is deflected toward an objective lens 29 through a polarized beam splitter 30. The deflected beam is focused by the objective lens 29, and is then coupled to the optical fiber 28. The preserved polarization plane direction of the optical fiber coincides with a plane of vibration of P-polarized light. Light reflected by the magnetooptical disk is returned to include an S-polarized light component due to the Kerr effect. The reflected light is converted to collimated light by the objective lens 29. The S-polarized light component of the collimated light is reflected by 100% by the polarized beam splitter 30, the P-polarized light component thereof is reflected by about 50%, and these light components are guided to a second polarized beam splitter 34. The second polarized beam splitter 34 similarly has characteristics to reflect the S-polarized light component by 100% and the P-polarized light component by 50%. The planes of polarization of the light components reflected by the beam splitter 34 are rotated by a halfwave plate 35. A third polarized beam splitter 37 has characteristics to reflect the S-polarized light by 100% and the P-polarized light by 100%, and serves as an analyzer. Therefore, a differential output of photodetectors 38 and 39 is obtained to reproduce a magnetooptical information signal. In this case, the halfwave plate 35 is rotated and adjusted to obtain a maximum signal amplitude.

Figure 18:
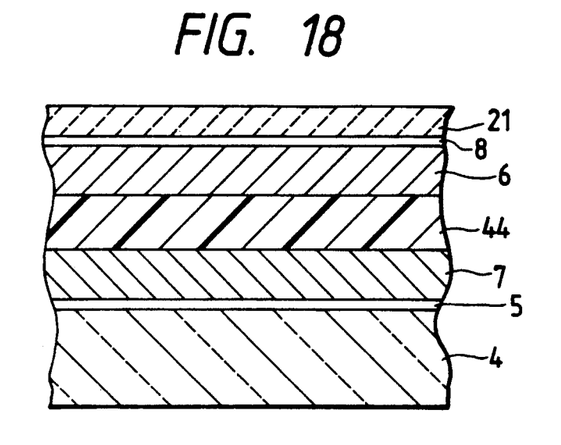
FIGS. 18 and 19 are schematic sectional views showing yet other structures of magnetooptical disks used in the present invention.
Figure 19:
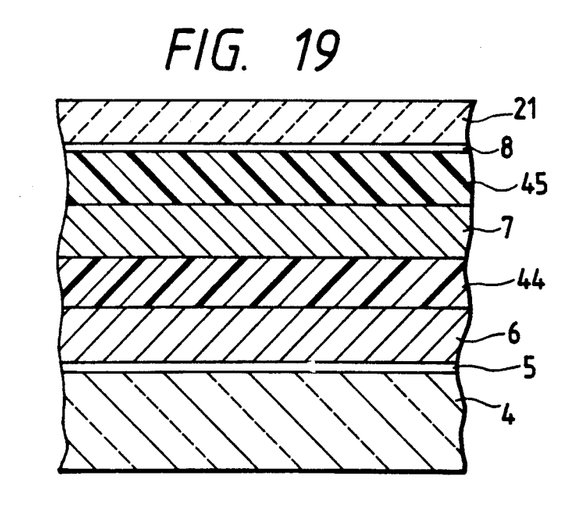

In the magnetooptical disk shown in FIG. 16, a protection layer 8 may be arranged under the recording layer 6, and an exchange coupling force adjusting layer 44 may be arranged between the recording layer 6 and the reference layer 7, thus obtaining a structure as shown in a schematic sectional view of FIG. 18. As shown in FIG. 19, a protection layer 8, an exchange coupling force adjusting layer 44, and a reproduction layer 45 may be provided to the magnetooptical disk shown in FIG. 14. The same reference numerals in FIGS. 18 and 19 denote the same layers as in FIGS. 5, 6, 14, and 16, and a detailed description thereof will be omitted.

Various other applications of the present invention may be made in addition to the above embodiments. For example, the shape of the magnetooptical recording medium is not limited to a disk shape. The present invention may be applied to tape-like or card-like magnetooptical recording media, and the like.

What is claimed is:

1. A method of recording information on a magnetooptical recording medium which includes a first magnetic layer and a second magnetic layer having a lower Curie temperature and a higher coercive force at room temperature than those of the first magnetic layer and being exchange-coupled to the first magnetic layer, and in which the first magnetic layer has a higher compensation temperature than the Curie temperature of the second magnetic layer, said method comprising the steps of:

applying a magnetic field, modulated in accordance with information to be recorded, from a magnetic head to the recording medium to record information on the first magnetic layer, prior to scanning the recording medium with a light beam to avoid thermal influence of the light beam on the recording medium; and scanning the recording medium with a light beam, after applying the magnetic field in said applying step, to heat the medium to a temperature at least near the Curie temperature of the second magnetic layer to transfer the information recorded on the first magnetic layer to the second magnetic layer.

2. A method according to claim 1, wherein said applying step comprises applying the magnetic field to record information on a region of the first magnetic layer, and the scanning step comprises scanning a portion of the region to transfer information to the portion of the region.

3. A method according to claim 1, further comprising maintaining the magnetic head in a position separated by a small distance from the medium by an air flow generated by relative movement between the magnetic head and the medium.

4. A method according to claim 1, further comprising applying the magnetic field and the light beam to the medium from different sides.

5. A method according to claim 1, further comprising applying the magnetic field and the light beam to the medium from the same side.

6. A method of recording information on a magnetooptical recording medium which includes a first magnetic layer, a second magnetic layer having a lower Curie temperature and a higher coercive force at room temperature than those of the first magnetic layer and being exchange-coupled to the first magnetic layer, and a third magnetic layer provided between the first magnetic layer and the second magnetic layer and having magnetization oriented in an in-surface direction at room temperature, and in which the direction of magnetization becomes perpendicular to a film surface of the recording medium when temperature is increased, said method comprising the steps of:

applying a magnetic field, modulated in accordance with information to be recorded, from a magnetic head to the recording medium to record information on the first magnetic layer, prior to scanning the recording medium with a light beam to avoid thermal influence of the light beam on the recording medium; and scanning the recording medium with a light beam, after applying the magnetic field in said applying step, to heat the recording medium to a temperature at least near the Curie temperature of the second magnetic layer to transfer the information recorded on the first magnetic layer to the second magnetic layer.

7. A method according to claim 6, wherein said applying step comprises applying the magnetic field to record information on a region of the first magnetic layer, and the scanning step comprises scanning a portion of the region to transfer information to the portion of the region.

8. A method according to claim 6, further comprising maintaining the magnetic head in a position separated by a small distance from the medium by an air flow generated by relative movement between the magnetic head and the medium.

9. A method according to claim 6, further comprising applying the magnetic field and the light beam to the medium from different sides.

10. A method according to claim 6, further comprising applying the magnetic field and the light beam to the medium from the same side.

11. A method of recording information on and/or reproducing recorded information from a magnetooptical recording medium which includes a first magnetic layer, a second magnetic layer having a lower Curie temperature and a higher coercive force at room temperature than those of the first magnetic layer and being exchange-coupled to the first magnetic layer, and a third magnetic layer exchange-coupled to the second magnetic layer and exhibiting a larger magnetooptical effect than that of the second magnetic layer, said method comprising the steps of:

applying a magnetic field, modulated in accordance with information to be recorded, from a magnetic head to the recording medium to record information on the first magnetic layer, prior to scanning the recording medium with a light beam to avoid thermal influence of the light beam on the recording medium;

scanning the recording medium with a light beam, after applying the magnetic field in said applying step, to heat the recording medium to a temperature at least near the Curie temperature of the second magnetic layer to transfer the information recorded on the first magnetic layer to the second magnetic layer;

generating magnetization in the third magnetic layer corresponding to the information transferred to the second magnetic layer by the exchange-coupled force between the second and third magnetic layers; and irradiating a polarized light beam onto the third magnetic layer and detecting a light beam reflected by the third magnetic layer through an analyzer to read out the recorded information.

12. A method according to claim 11, wherein said applying step comprises applying the magnetic field to record information on a region of the first magnetic layer, and the scanning step comprises scanning a portion of the region to transfer information to the portion of the region.

13. A method according to claim 11, further comprising maintaining the magnetic head in a position separated by a small distance from the medium by an air flow generated by relative movement between the magnetic head and the medium.

14. A method according to claim 11, further comprising applying the magnetic field and the light beam to the medium from different sides.

15. A method according to claim 11, further comprising applying the magnetic field and the light beam to the medium from the same side.

16. An information recording system comprising:
a magnetooptical recording medium comprising a first magnetic layer and a second magnetic layer having a lower Curie temperature and a higher coercive force at room temperature than those of the first magnetic layer and being exchange-coupled to the first magnetic layer, said first magnetic layer having a higher compensation temperature than the Curie temperature of the second magnetic layer;
an optical head for scanning the recording medium with a light beam in a scanning direction; and
a magnetic head, provided at a position ahead of the light beam with respect to the scanning direction, for applying to the recording medium a magnetic field modulated in accordance with information to be recorded,
wherein said optical head and said magnetic head are spaced apart from each other by at least such a distance to avoid overlap of regions on said recording medium respectively influenced thermally by the light beam from said optical head and magnetically by the magnetic field from said magnetic head.

17. A system according to claim 16, wherein said magnetic head is spaced apart from said recording medium by a minute distance by air flow caused by movement of said recording medium relative to said magnetic head.

18. A system according to claim 16, wherein said optical head and said magnetic head are disposed on opposite sides of said recording medium.

19. A system according to claim 16, wherein said optical head and said magnetic head are disposed on the same side of said recording medium.

20. An information recording system comprising:
a magnetooptical recording medium comprising a first magnetic layer, a second magnetic layer having a lower Curie temperature and a higher coercive force at room temperature than those of the first magnetic layer and being exchange-coupled to the first magnetic layer, and a third magnetic layer provided between the first magnetic layer and the second magnetic layer and having a magnetization oriented in an in-surface direction at room temperature and in which a direction of magnetization becomes perpendicular to a film surface of the recording medium when temperature is increases;
an optical head for scanning the recording medium with a light beam in a scanning direction; and
a magnetic head, provided at a position ahead of the light beam with respect to the scanning direction, for applying to the recording medium a magnetic field modulated in accordance with information to be recorded,
wherein said optical head and said magnetic head are spaced apart from each other by at least such a distance to avoid overlap of regions on said recording medium respectively influenced thermally by the light beam from said optical head and magnetically by the magnetic field from said magnetic head.

21. A system according to claim 20, wherein said magnetic head is spaced apart from said recording medium by a minute distance by air flow caused by movement of said recording medium relative to said magnetic head.

22. A system according to claim 20, wherein said optical head and said magnetic head are disposed on opposite sides of said recording medium.

23. A system according to claim 20, wherein said optical head and said magnetic head are disposed on the same side of said recording medium.

24. An information recording and reproducing system comprising:
a magnetooptical recording medium comprising a first magnetic layer, a second magnetic layer having a lower Curie temperature and a higher coercive force at room temperature than those of the first magnetic layer and being exchange-coupled to the first magnetic layer, and a third magnetic layer exchange-coupled to the second magnetic layer and exhibiting a larger magnetooptical effect than that of the second magnetic layer;
an optical head for scanning the recording medium with a light beam in a scanning direction; and
a magnetic head, provided at a position ahead of the light beam in the scanning direction, for applying to the recording medium a magnetic field modulated in accordance with information to be recorded, wherein said optical head and said magnetic head are spaced apart from each other by at least such a distance to avoid overlap of regions on said recording medium respectively influenced thermally by the light beam from said optical head and magnetically by the magnetic field from the magnetic head; and
means for irradiating said third magnetic layer with a polarized light beam to detect a light beam reflected by the third magnetic layer through an analyzer to read out the recorded information.

25. A system according to claim 24, wherein said magnetic head is spaced apart from said recording medium by a minute distance by air flow caused by relative movement of said recording medium relative to said magnetic head.

26. A system according to claim 24, wherein said optical head and said magnetic head are disposed on opposite sides of said recording medium.

27. A system according to claim 24, wherein said optical head and said magnetic head are disposed on the same side of said recording medium.

* * * * *

UNITED STATES PATENT AND TRADEMARK OFFICE
CERTIFICATE OF CORRECTION

PATENT NO. : 5,233,578
DATED : August 3, 1993
INVENTOR(S) : Masakuni Yamamoto, et al.

It is certified that error appears in the above-indentified patent and that said Letters Patent is hereby corrected as shown below:

ON THE COVER PAGE
Item [56] References Cited
UNDER "FOREIGN PATENT DOCUMENTS"

"02538978    3/1988   European Pat. Off." should read
--0258978    3/1988   European Pat. Off.--; and "3239636     10/1988  Japan" should read
--63-239636  10/1988  Japan--.

COLUMN 1

Line 52, "Vol. 16, No. 17" should read --Vol. 16, No. 7--.

COLUMN 4

Line 15, "field-" should read --field--;
Line 37, "corresponds" should read --corresponds to;
Line 47, "over" should be deleted; and
Line 48, "as" should be deleted.

UNITED STATES PATENT AND TRADEMARK OFFICE
CERTIFICATE OF CORRECTION

PATENT NO. : 5,233,578
DATED : August 3, 1993
INVENTOR(S) : Masakuni Yamamoto, et al.

It is certified that error appears in the above-indentified patent and that said Letters Patent is hereby corrected as shown below:

COLUMN 6

Line 68, "line C-C-" should read --line C-C'--.

COLUMN 7

Line 57, "length $L_{MG}$" should read --a length $L_{MG}$--.

COLUMN 10

Line 59, "exchange-coupled" should read --exchange-coupling--.

COLUMN 11

Line 65, "increases;" should read --increased;--.

Signed and Sealed this

Fifth Day of April, 1994

Attest:

BRUCE LEHMAN

*Attesting Officer*  *Commissioner of Patents and Trademarks*